US011432189B2

(12) United States Patent
Cheon

(10) Patent No.: US 11,432,189 B2
(45) Date of Patent: Aug. 30, 2022

(54) METHODS AND APPARATUS FOR DISTRIBUTED BASEBAND SIGNAL PROCESSING FOR FIFTH GENERATION (5G) NEW RADIO DOWNLINK SIGNALS

(71) Applicant: Marvell World Trade Ltd., Saint Michael (BB)

(72) Inventor: Hyun Soo Cheon, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 44 days.

(21) Appl. No.: 16/536,828

(22) Filed: Aug. 9, 2019

(65) Prior Publication Data

US 2020/0367099 A1 Nov. 19, 2020

Related U.S. Application Data

(60) Provisional application No. 62/849,029, filed on May 16, 2019.

(51) Int. Cl.
*H04W 28/06* (2009.01)
*H04B 7/06* (2006.01)
*H04W 72/04* (2009.01)

(52) U.S. Cl.
CPC .......... *H04W 28/06* (2013.01); *H04B 7/0617* (2013.01); *H04W 72/0446* (2013.01); *H04W 72/0453* (2013.01)

(58) Field of Classification Search
CPC ............. H04W 28/06; H04W 72/0446; H04W 72/0453; H04W 8/30; H04B 7/0617; H04L 1/0025; H04L 1/0029; H04L 5/0053; H04L 29/0604; H04L 67/2828; H04L 9/04; H04L 29/08783
See application file for complete search history.

(56) References Cited

U.S. PATENT DOCUMENTS

2008/0259796 A1* 10/2008 Abousleman ....... H04L 65/1083
370/233
2011/0135013 A1* 6/2011 Wegener ................. H03M 7/40
375/241

(Continued)

*Primary Examiner* — Chi H Pham
*Assistant Examiner* — Ji-Hae Yea
(74) *Attorney, Agent, or Firm* — JW Law Group; James M. Wu

(57) ABSTRACT

Methods and apparatus for baseband signal compression of fifth generation new radio downlink signals. In an embodiment, a method includes receiving compressed packets over a transmission medium from a central office that performs a first portion of baseband processing to generate the compressed packets from downlink data, receiving configuration parameters, performing a second portion of baseband processing to decompress the compressed packets using the configuration parameters to generate the downlink data, and transmitting the downlink data. An apparatus includes an interface that receives compressed packets and configuration parameters over a transmission medium from a central office that includes a first baseband processing section that generate the compressed packets from downlink data. The apparatus also includes a second baseband processing section that decompresses the compressed packets using the configuration parameters to extract the downlink data, and a radio frequency (RF) interface that transmits the downlink data.

19 Claims, 5 Drawing Sheets

(56) References Cited

U.S. PATENT DOCUMENTS

| | | | |
|---|---|---|---|
| 2014/0237201 A1* | 8/2014 | Swift | G06F 16/27 |
| | | | 711/162 |
| 2014/0307641 A1* | 10/2014 | Shen | H04B 17/345 |
| | | | 370/329 |
| 2019/0007246 A1* | 1/2019 | Fertonani | H04L 25/02 |
| 2019/0028230 A1* | 1/2019 | Dabbagh | H04B 7/0617 |
| 2019/0044646 A1* | 2/2019 | Xu | H04L 27/0008 |
| 2019/0089434 A1* | 3/2019 | Rainish | H04B 7/086 |

* cited by examiner

METHODS AND APPARATUS FOR DISTRIBUTED BASEBAND SIGNAL PROCESSING FOR FIFTH GENERATION (5G) NEW RADIO DOWNLINK SIGNALS

CLAIM TO PRIORITY

This application claims priority from U.S. Provisional Application No. 62/849,029, filed on May 16, 2019, and entitled "METHOD AND APPARATUS FOR BASEBAND SIGNAL COMPRESSION OF 5G NR DOWNLINK," which is incorporated by reference herein in its entirety.

FIELD

The exemplary embodiments of the present invention relate to operation of telecommunications networks. More specifically, the exemplary embodiments of the present invention relate to receiving and processing data streams for use in wireless telecommunication networks.

BACKGROUND

With a rapidly growing trend of mobile and remote data access over a high-speed communication networks, such as Long Term Evolution (LTE), fourth generation (4G), and fifth generation (5G) wireless networks, accurately delivering and deciphering data streams become increasingly challenging and difficult.

During downlink operation, baseband signals at a central office need to be transmitted to remote sites for transmission to user equipment. Typically, wireless operators utilize leased data lines to transmit information between the central office and the remote sites. It is desirable to use these leased lines as efficiently as possible to allow the use of less expensive lines or allow the transmission of more 5G channels using the existing lines.

Therefore, it is desirable to have a system that enables efficient transmission of downlink baseband signals from a central office to remote sites.

SUMMARY

In various exemplary embodiments, a downlink transmission system comprising methods and apparatus are provided for transmission of downlink signals from a central office to remote sites. In an embodiment, a primitive downlink baseband signal vector is defined for each resource block as beam (or antenna) index/gain, index/modulation, or order/modulation data. In an embodiment, a 5G NR symbol (OFDMA symbol) is compressed with a packet comprising multiple primitive data vectors and transferred from the baseband signal processor in the central office to the remote radio head at the antenna site. By utilizing a downlink baseband front-end and decompressor (symbol mapper+ beamformer), the remote radio head can successfully decompress the downlink baseband signal information to the time domain sequences, which is directly upshifted and transferred via transmit antennas.

The various embodiments are fully compliant with 5G NR standards without adding any other side information, provide ultra-low latency since the required procedures are straightforward and don't include time-consuming or complicated signal processing, and provide computation power savings at the central office by offloading downlink signal processing to remote sites.

In an embodiment, a method is provided that includes receiving compressed packets over a transmission medium from a central office that performs a first portion of baseband processing to generate the compressed packets from downlink data, receiving configuration parameters, performing a second portion of baseband processing to decompress the compressed packets using the configuration parameters to generate the downlink data, and transmitting the downlink data.

In an embodiment, an apparatus is provided that includes an interface that receives compressed packets and configuration parameters over a transmission medium from a central office that includes a first baseband processing section that generate the compressed packets from downlink data. The apparatus also includes a second baseband processing section that decompresses the compressed packets using the configuration parameters to extract the downlink data, and a radio frequency (RF) interface that transmits the downlink data.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
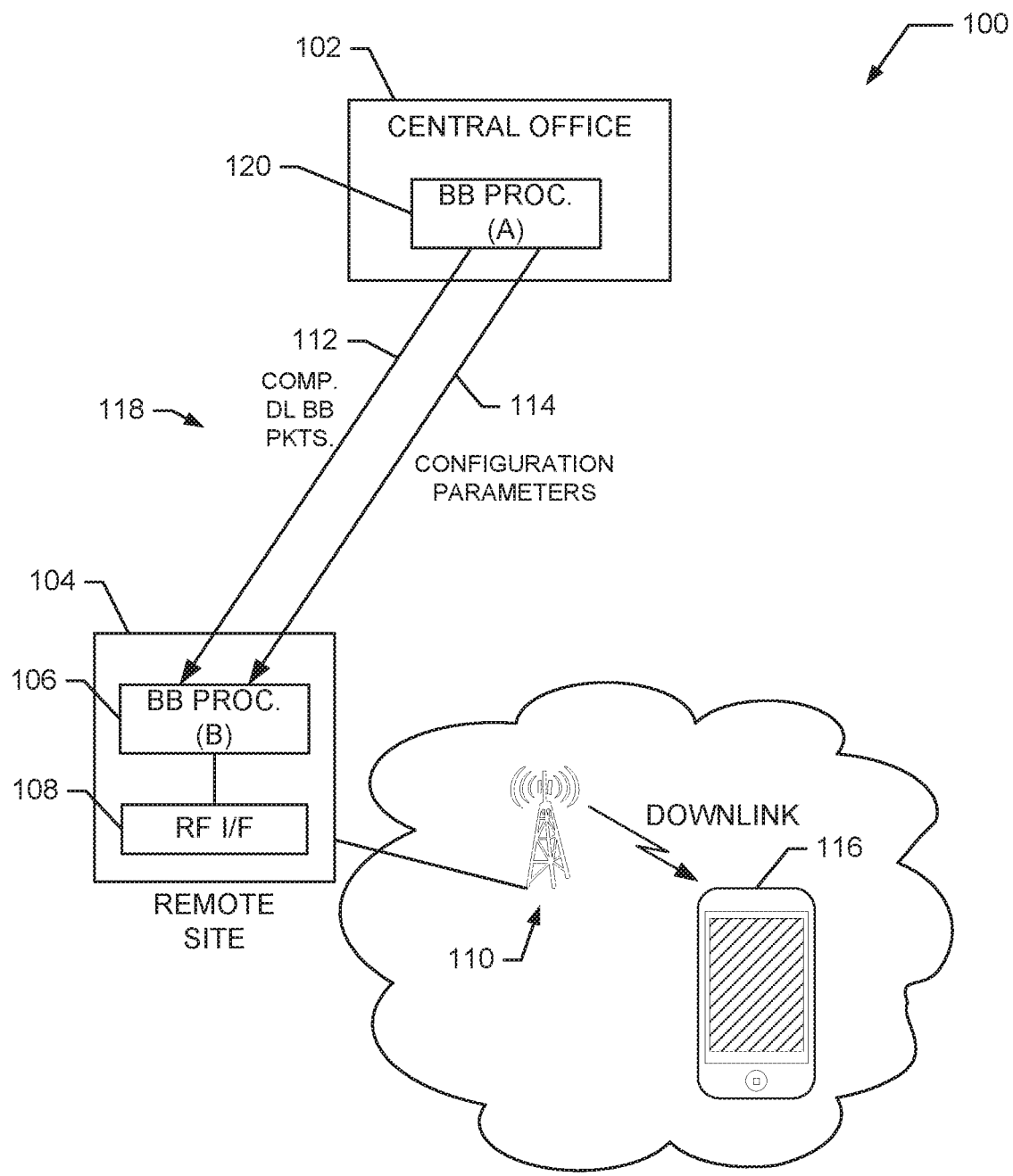
FIG. 1 shows a block diagram of a communication network that includes an exemplary embodiment of a distributed downlink baseband processing system.

Aspects of the present invention are described below in the context of methods and apparatus for compression of 5G new radio downlink signals.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a block diagram of a communication network 100 that includes an exemplary embodiment of a distributed downlink baseband processing system. The network 100 may operate as a fourth generation ("4G"), Long Term Evolution (LTE), Fifth Generation (5G), New Radio (NR), or combination of 4G and 5G cellular network configurations.

The network 100 includes a central office 102 and remote site 104 that communication with each other using transmission lines 118. In an embodiment, the central office 102 and remote site 104 are separated by a large distance. The transmission lines 118 are optical fiber or other suitable transmission medium.

In an embodiment, the central office 102 comprises a baseband processing section (A) 120 that performs first portion of baseband processing to compress and transmit compressed downlink baseband packets 112 to the remote site 104 using the transmission lines 118. In an embodiment, the baseband processing section (A) 120 also generates configuration parameters 114 that are transmitted to the remote site 104 using the transmission lines 118. The configuration parameters 114 describe how to decompress the compressed downlink packets 112.

The remote site 104 comprises baseband (BB) processing section (B) 106 and an RF interface 108. The RF interface 108 transmits downlink communications to user equipment, such as user equipment 116, using antenna 110. The RF interface 108 receives the downlink communications from the baseband processing section 106. The BB processing section 106 performs a second portion of baseband processing to receive and decompress the compressed downlink packets 112 according to the received configuration parameters. The decompressed downlink packets are provided to the RF interface for transmission to user equipment.

Thus, the network 100 illustrates a distributed baseband processing system that efficiently utilizes transmission lines between the central office 102 and the remote site 104. The baseband processing section (A) 120 performs a first portion of the baseband processing to compress and transmit downlink packets and configuration parameters to the remote site 104. The remote site 104 performs a second portion of the baseband processing to receive and decompress the compressed packets 112 according to the received configuration parameters 114 to generate downlink packets for transmission to user equipment. The compressed packets 112 contain downlink data in compressed format without loss to efficiently utilize the transmission lines 118, thereby allowing the use of less expensive transmission line or to allow more channels of information to be transmitted over existing transmission lines. A more detailed description of the distributed baseband processing system is provided below.

Figure 2:
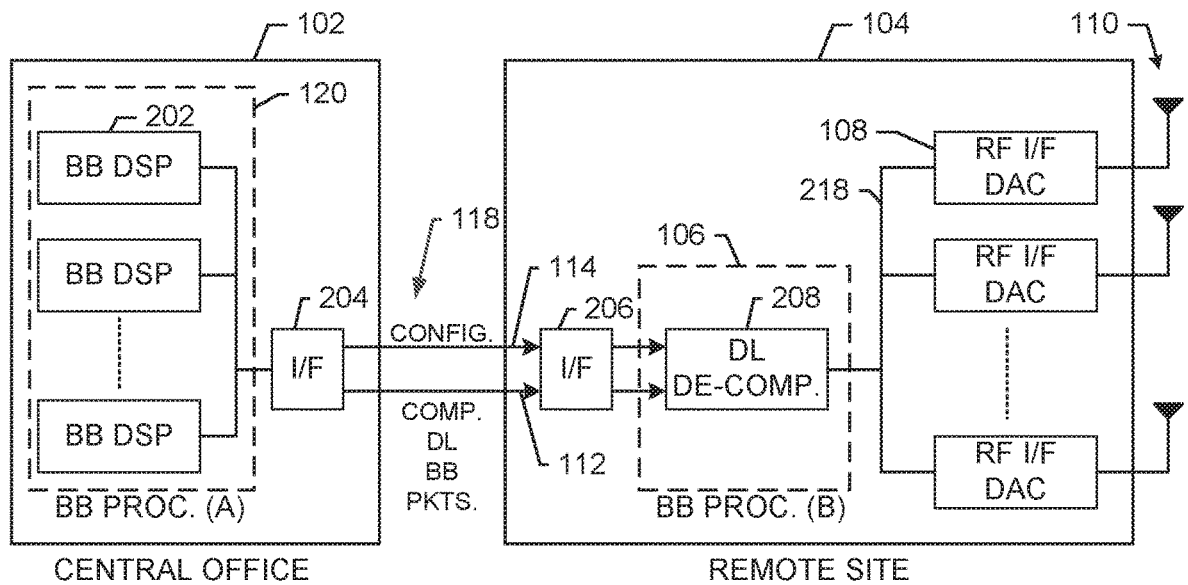
FIG. 2 shows an exemplary detailed embodiment of a central office and remote site shown in FIG. 1.

FIG. 2 shows an exemplary detailed embodiment of a central office 102 and remote site 104 shown in FIG. 1. In an embodiment, the central office 102 includes one or more baseband (BB) DSPs, such as DSP 202, that are part of the BB processing section (A) 120. The central office 102 also includes an interface 204 that transmits and receives information over transmission lines 118. In an embodiment, the DSPs, such as DSP 202, compress downlink baseband packets and transmit these packets 112 to the remote site 104 using transmission lines 118. The DSPs also transmit the configuration parameters 114 to the remote site 104 using the interface 204 and transmission lines 118. In various embodiments, any type of packetized transmission format can be utilized. The configuration parameters 114 describe how the compressed downlink packets 112 are to be decompressed.

The remote site 104 includes an interface 206 that receives the compressed downlink packets 112 and the configuration parameters 114 and passes this information to a downlink de-compressor 208 that is part of the BB processing section (B) 106. The decompressor 208 decompresses downlink packets 112 according to the configuration parameters 114 and passes the decompressed downlink packets 218 to one or more RF interfaces, such as RF interface 108. For example, each RF interface receives downlink packets for transmission using antennas, such as antenna 110, and converts the received digital downlink packets to an analog signal format using digital-to-analog (DAC) converters. Thus, the RF interfaces generate analog downlink signals that are transmitted by the antennas 110 to user equipment.

Figure 3:
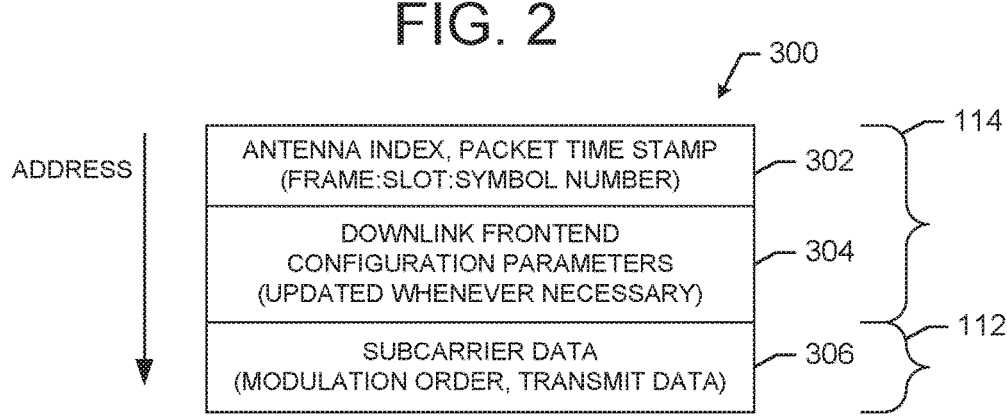
FIG. 3 shows an exemplary compressed downlink data packet generated by an embodiment of a first baseband processing section and decompressed by an embodiment of a second baseband processing section.

FIG. 3 shows an exemplary compressed downlink data packet 300 generated by an embodiment of the first baseband processing section 120 and decompressed by an embodiment of the second baseband processing section 106. During operation, the baseband processing section 120 generates the data packet 300 for each antenna. The data packet 300 includes a header 302 that comprises an antenna index, packet time stamp, and a (frame:slot:symbol number), which identifies the packet. The data packet 300 also includes downlink frontend configuration parameters 304 that are provided when necessary. The data packet 300 also includes subcarrier data 306 that comprise modulation order and transmit data. In an embodiment, the generated data packets 300 can be transmitted from the central office 102 to the remote site 104 in any order.

Configuration Parameters

In an embodiment, the following is a non-exhaustive list of configuration parameters 304. It should be noted that in other embodiments, other configuration parameters may be utilized.

Figure 4:
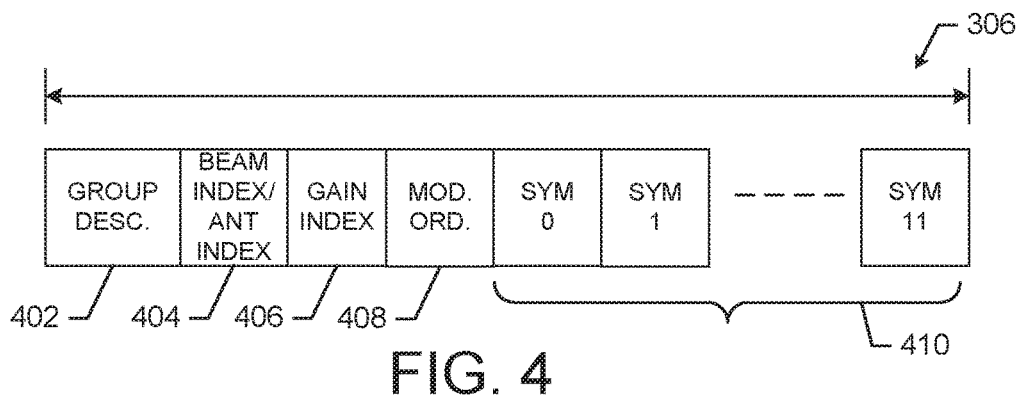
FIG. 4 shows an embodiment of a compression format for each resource block of downlink subcarrier data.

1. Antenna index
2. FFT size
3. Number of resource blocks
4. Subcarrier spacing
5. Cyclic prefix size
6. Cyclic delay diversity offset
7. Phase rotation
8. Antenna calibration on/offset
9. Antenna gain
10. Subcarrier shift
11. Beamformer matrix FIG. 4 shows an embodiment of a compression format for each resource block of the subcarrier data 306. For example, the compression format includes a group descriptor 402, beam index/antenna index 404, gain index 406, modulation order 408, and a plurality of symbols 410. In an embodiment, the group descriptor 402 has a values of zero or 1 where a zero means empty and a 1 means normal traffic. The beam index/antenna index 404 has a range between [0-(n−1)], which represents a beam or antenna index value. The gain index 406 has a range between [0-(n−1)], which represents a gain index identified in a predefined gain table. The modulation order 408 has a value that represents modulation from BPSK to 256 QAM. Each of the symbols 410 comprise m-bit binary data.

Figure 5:
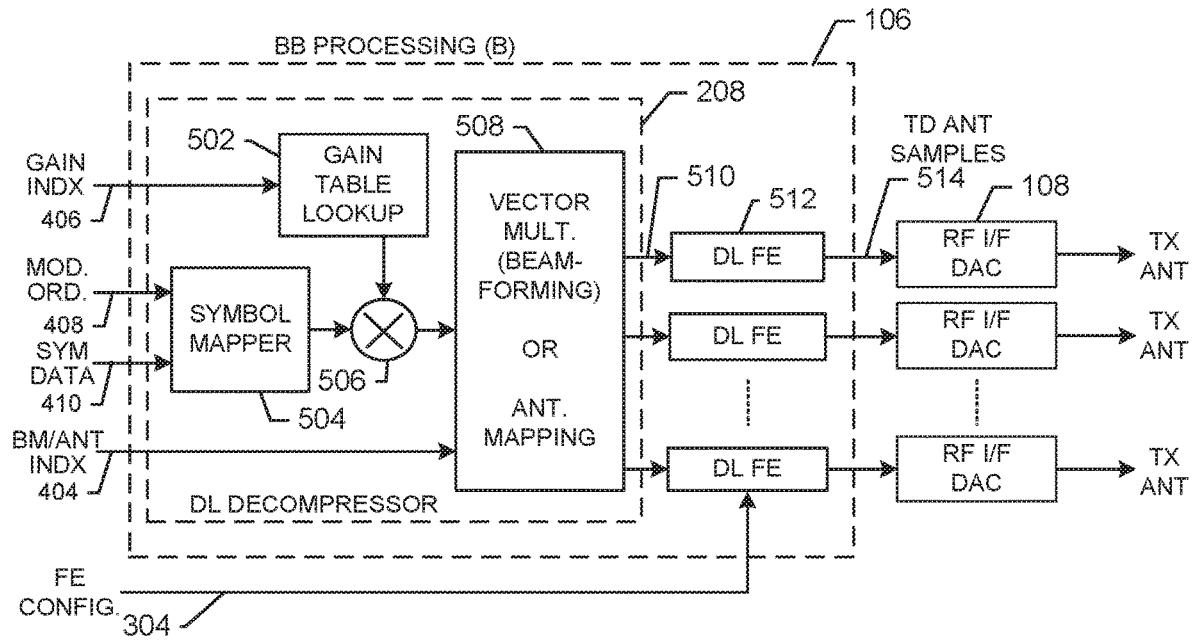
FIG. 5 shows a detailed embodiment of the baseband processing section (B) that comprises the downlink decompressor shown in FIG. 2.

FIG. 5 shows a detailed embodiment of the baseband processing section (B) 106 that comprises the downlink decompressor 208 shown in FIG. 2. In an embodiment, the decompressor 208 comprises gain table 502, symbol mapper 504, multiplier 506, and vector processor or multiplier 508. The symbol mapper 504 receives the symbol data 410 and maps them according to the modulation order 408. The mapped symbols are input to the multiplier 506 that adjusts the gain based on an output from the gain table 502. The gain index 406 is used to access the gain table 402. The gain adjusted symbols output from the multiplier 506 along with the beam index/antenna index 404 are input to the vector multiplier 508, which performs one of beamforming or antenna mapping functions to generate frequency domain baseband samples 510 to be transmitted. The frequency domain samples 510 are input to one or more frontends, such as front end 512, which use the frontend configuration parameters 304 to generate time domain samples 514 that are input to RF interfaces (e.g., 108) where the time domain samples are converted to analog signals for transmission by transmit antennas (e.g., 110). In various embodiments, the time domain antenna samples are transmitted using one of a 4G, 5G, or Wi-Fi transmission formats.

Figure 6:
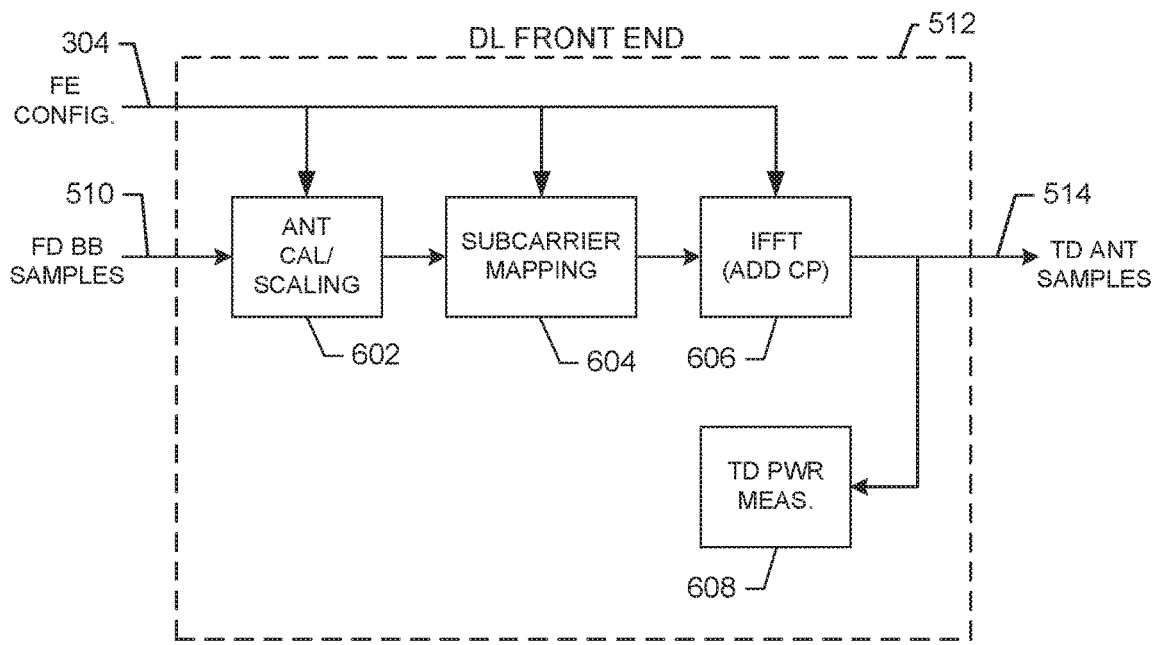
FIG. 6 shows an exemplary embodiment of the downlink front end shown in FIG. 5.

FIG. 6 shows an exemplary embodiment of the downlink front end 512 shown in FIG. 5. In an embodiment, the front end 512 comprises an antenna calibration and scaling circuit 602, subcarrier mapping circuit 604, and inverse Fourier transform circuit 606. The front end 512 also includes a time domain measurement circuit 608. In an embodiment, the frequency domain baseband samples 510 output from the decompressor 208 are received by the calibration and scaling circuit 602, which performs calibration and/or scaling function. An output of the circuit 602 is input to the subcarrier mapping circuit 604, which maps subcarriers. An output of the mapping circuit 604 is input to the inverse Fourier transform circuit 606, which also adds a cyclic prefix (CP) to generate the time domain baseband samples 514 for transmission.

Figure 7:
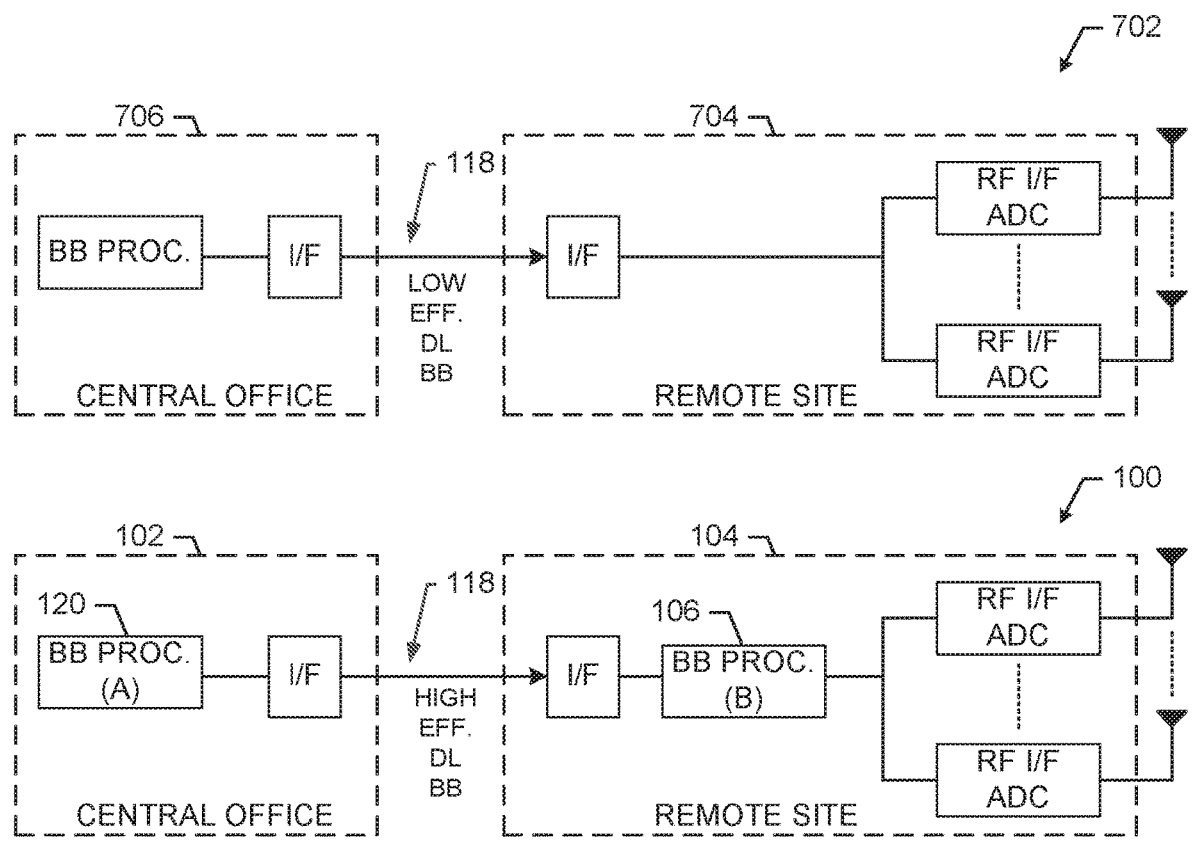
FIG. 7 illustrates how embodiments of the distributed downlink baseband processing system transmits downlink signals from a central office to a remote site with greater efficiency than conventional systems.

FIG. 7 illustrates how embodiments of the distributed baseband compression system transmit downlink signals from a central office to a remote site with greater efficiency than conventional systems. FIG. 7 shows a conventional downlink processing system 702 in which baseband signals are processed at a central office 706 and transmitted over transmission lines 118 to a remote site 704. All of the baseband processing is performed at the central office so that the transmission lines 118 must carry low efficiency downlink baseband information. For example, transmission parameters and data computed at the central office 706 are transmitted to the remote site over the transmission lines 118, which results in low efficiency transmission of information.

In contrast, the distributed baseband compression system 100 operates to perform a first portion of baseband processing at the central office 102. For example, the BB processing section (A) performs a first portion of the baseband processing at the central office 102, and the BB processing section (B) performs a second portion of the baseband processing at the remote site 104. Since a portion of the baseband processing is performed at the remote site 104, the system 100 generates high efficiency compressed baseband packets at the central office that are transmitted over the transmission lines 118 to the remote site 104 where additional baseband processing is performed. Thus, the transmission lines 118 are more efficiently utilizes by embodiments of the system 100.

Figure 8:
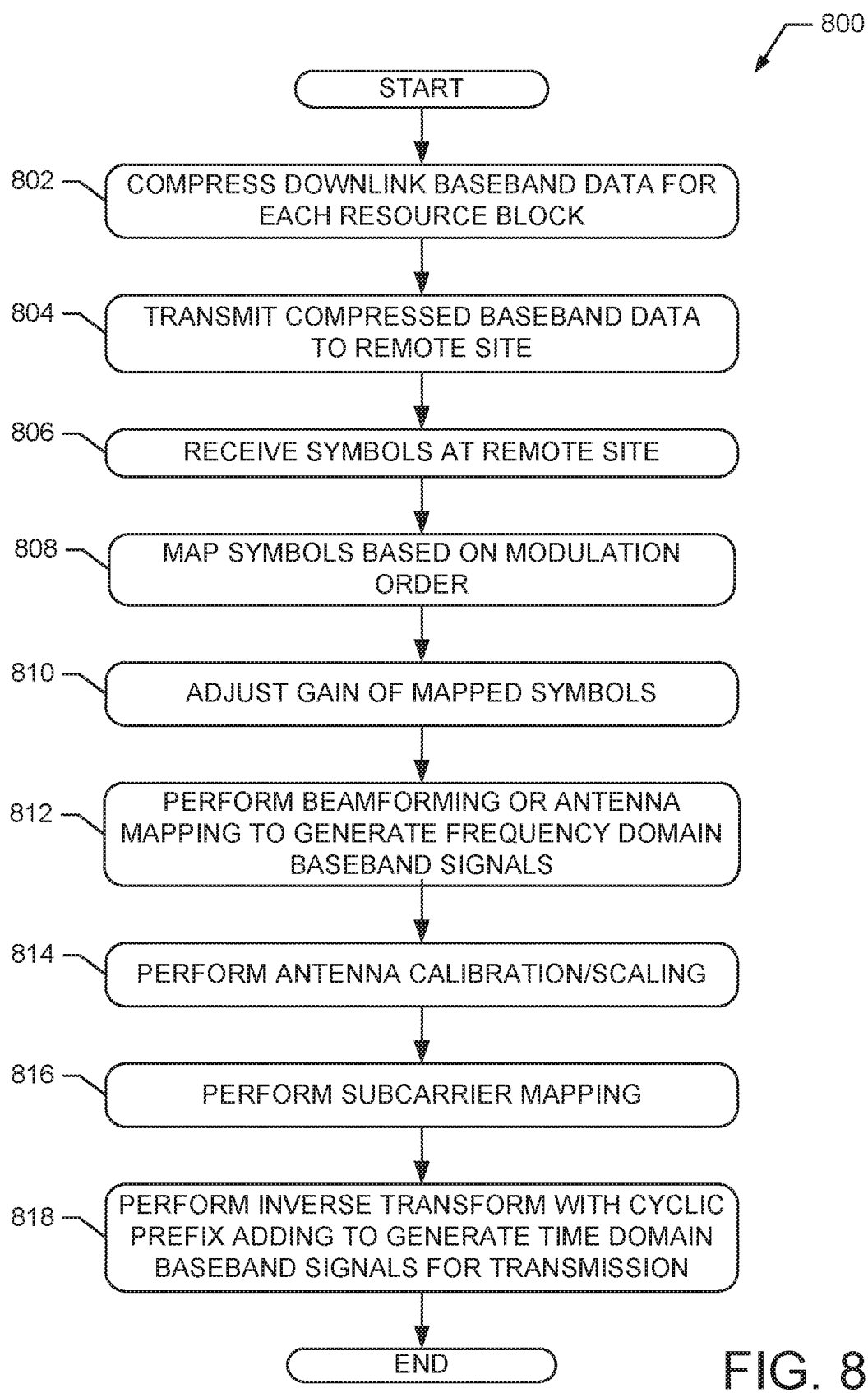
FIG. 8 shows an exemplary method for performing downlink baseband compression in accordance with exemplary embodiments of a distributed downlink baseband processing system.

FIG. 8 shows an exemplary method for performing downlink baseband compression in accordance with exemplary embodiments of a downlink transmission system. For example, the method 800 is suitable for use with the downlink transmission system shown in FIG. 2.

At block 802, baseband symbols in resource blocks are compressed. For example, the central office includes baseband processors 202 that generate baseband symbols in resource blocks for transmission to remote sites. In an embodiment, the baseband processors 202 compress the resource blocks as illustrated in FIG. 3 to form compressed blocks.

At block 804, the compressed baseband resource blocks are transmitted to remote sites. For example, the central office 102 uses interface 204 to transmit the resource blocks to the remote site 104 using the transmission lines 118.

At block 806, the compressed resource blocks are received at remotes sites. For example, the compressed resource blocks 112 are received at the remote site 104 by interface 206.

At block 808, the received compressed resource blocks are processed at the remote site by the second baseband processing section 106. For example, the compressed resource blocks 112 are processed by the downlink decompressor 208. In an embodiment, the decompressor 208 comprises a symbol mapper 504 that maps the received symbols based on modulation order.

At block 810, the gain of the mapped symbols is adjusted. In an embodiment, the decompressor 208 comprises a gain table 502 and multiplier 506 that adjust the gain of the mapped symbols.

At block 812, beamforming or antenna mapping is performed to generate frequency domain baseband signals. For example, the vector processor or multiplier 508 performs this operation. The frequency domain baseband signals 510 then flow into a downlink front end 512.

At block 814, the downlink front end performs antenna calibration and/or scaling based on the configuration parameters 304. For example, the block 602 performs this function.

At block 816, the downlink front end performs subcarrier mapping based on the configuration parameters 304. For example, the block 604 performs this function.

At block 818, the downlink front end performs an inverse transform and adds a cyclic prefix based on the configuration parameters 304 to generate time domain signals 514 for transmission. For example, the block 606 performs this function.

Thus, the method 800 operates to perform downlink baseband compression in accordance with exemplary embodiments of a downlink transmission system. It should be noted that the operations of the method 800 can be modified, added to, deleted, rearranged, or otherwise changed within the scope of the embodiments.

While particular embodiments of the present invention have been shown and described, it will be obvious to those skilled in the art that, based upon the teachings herein, changes and modifications may be made without departing from the exemplary embodiments of the present invention and its broader aspects. Therefore, the appended claims are intended to encompass within their scope all such changes and modifications as are within the true spirit and scope of this exemplary embodiments of the present invention.

What is claimed is:

1. A method for facilitating network communication, comprising:
   compressing downlink data at a central office during a first portion of baseband processing to generate compressed packets;
   receiving the compressed packets representing compressed downlink data over a first transmission medium from the central office to a remote site, wherein receiving the compressed packets includes receiving subcarrier data in a header for each of the compressed packets;
   receiving configuration parameters indicating how to decompose the compressed packets via a second transmission medium from the central office to the remote site;
   performing a second portion of baseband processing to decompress the compressed packets in response to the configuration parameters to generate the downlink data; and
   transmitting the downlink data from the remote site to a user equipment via a wireless network.

2. The method of claim 1, wherein the operation of receiving comprises receiving a header for each of the compressed packets.

3. The method of claim 2, wherein the operation of receiving comprises receiving an antenna index, packet time stamp, frame number, slot number, and symbol number in a header for each of the compressed packets.

4. The method of claim 1, wherein the operation of receiving comprises receiving frontend configuration parameters for each of the compressed packets.

5. The method of claim 1, wherein the operation of receiving comprises receiving transmit data comprising one or more symbols as part of the subcarrier data in a header for each of the compressed packets.

6. The method of claim 5, wherein the operation of receiving comprises receiving at least one of a group descriptor, beam index, antenna index, gain index, and modulation order parameter as part of the subcarrier data in a header for each of the compressed packets.

7. The method of claim 6, wherein the operation of performing comprises utilizing the modulation order parameter and the data to perform symbol mapping to generate mapped symbols.

8. The method of claim 7, wherein the operation of performing comprises accessing a gain lookup table using the gain index to determine a gain parameter.

9. The method of claim 8, wherein the operation of performing comprises multiplying the mapped symbols with the gain parameter to generate gain adjusted symbols.

10. The method of claim 9, wherein the operation of performing comprises performing at least one of vector multiplying or beamforming on the gain adjusted symbols to generate frequency domain baseband samples associated with one or more antennas.

11. The method of claim 10, wherein the operation of performing comprises processing the frequency domain baseband samples to generate time domain antenna samples associated with the one or more antennas.

12. The method of claim 11, further comprising performing at least one of antenna scaling, subcarrier mapping, and inverse Fourier transform functions on the frequency domain baseband samples based on the frontend configuration parameters to generate the time domain antenna samples.

13. The method of claim 12, wherein the operation of transmitting the downlink data comprises transmitting the time domain antenna samples using the one or more antennas.

14. The method of claim 13, wherein the operation of transmitting comprises transmitting the time domain antenna samples using one of 4G, 5G, and Wi-Fi transmission formats.

15. An apparatus for facilitating network communication, comprising:
   a central office for facilitating a first portion of downlink transmission, the central office includes:
   a baseband ("BB") digital signal processor ("DSP") of a first BB processing section configured to generate compressed packets by compressing downlink data and configuration parameters associated to the compressed packets, wherein each of the compressed packets further includes:
      a header that includes an antenna index, packet time stamp, frame number, slot number, and symbol number,
      frontend configuration parameters, and
      transmit data that contains one or more symbols and at least one of a group descriptor, beam index, antenna index, gain index, and modulation order parameter; and
   a remote site coupled to the central office for facilitating a second portion of downlink transmission, the remote site includes:
   an interface configured to receive the compressed packets via a first transmission medium and the configuration parameters over a second transmission medium from the BB DSP;
   a downlink de-compressor of a second baseband processing section configured to decompress the compressed packets in accordance with the configuration parameters to extract the downlink data; and
   a radio frequency (RF) interface able to transmit the downlink data to a user equipment via one or more antennas.

16. The apparatus of claim 15, wherein the first baseband processing section comprises:

a symbol mapper that utilizes the modulation order parameter and the data to perform symbol mapping to generate mapped symbols;

a gain lookup table that outputs a gain parameters based on the gain index; and a multiplier that multiplies the mapped symbols with the gain parameter to generate gain adjusted symbols.

17. The apparatus of claim 16, wherein the first baseband processing section comprises:

a vector processor that performs at least one of vector multiplying or beamforming on the gain adjusted symbols to generate frequency domain baseband samples; and, at least one of antenna scaling circuit, subcarrier mapping circuit, and inverse Fourier transform circuit that process the frequency domain baseband samples based on the frontend configuration parameters to generate time domain antenna samples.

18. The apparatus of claim 17, wherein the radio frequency (RF) interface transmits the time domain antenna samples from the one or more antennas using one of a 4G, 5G, or Wi-Fi transmission format.

19. A network system for facilitating network communication, comprising:

means for compressing downlink data at a central office during a first portion of baseband processing to generate compressed packets;

means for receiving the compressed packets representing downlink data over a first transmission medium from the central office to a remote site, wherein the means for receiving includes means for receiving an antenna index, packet time stamp, frame number, slot number, and symbol number in a header for each of the compressed packets;

means for receiving configuration parameters indicating how to decompose the compressed packets via a second transmission medium from the central office to the remote site;

means for performing a second portion of baseband processing to decompress the compressed packets in response to the configuration parameters to generate the downlink data; and means for transmitting the downlink data from the remote site to a user equipment via a wireless network.

\* \* \* \* \*